US008999100B2

(12) United States Patent
Carmichael

(10) Patent No.: US 8,999,100 B2
(45) Date of Patent: Apr. 7, 2015

(54) METHOD FOR APPLYING LABELS TO ARTICLES

(75) Inventor: James Carmichael, Parma (IT)

(73) Assignee: SIDEL S.p.A. con Socio Unico (IT)

( * ) Notice: Subject to any disclaimer, the term of this patent is extended or adjusted under 35 U.S.C. 154(b) by 148 days.

(21) Appl. No.: 13/884,178

(22) PCT Filed: Nov. 9, 2011

(86) PCT No.: PCT/EP2011/069780
§ 371 (c)(1), (2), (4) Date: Jul. 30, 2013

(87) PCT Pub. No.: WO2012/062823
PCT Pub. Date: May 18, 2012

(65) Prior Publication Data

US 2014/0000803 A1 Jan. 2, 2014

(30) Foreign Application Priority Data

Nov. 9, 2010 (IT) .............................. TO2010A0894

(51) Int. Cl.
*B29C 65/00* (2006.01)
*B31B 1/60* (2006.01)
(Continued)

(52) U.S. Cl.
CPC ... *B65C 3/08* (2013.01); *B65C 3/16* (2013.01); *B65C 3/163* (2013.01); *B65C 9/1819* (2013.01)

(58) Field of Classification Search
USPC ........... 156/60, 285, 286, 556, 539, 538, 349, 156/215, 212, 196, 250, 256, 443, 446, 86, 156/308.6, 449, 450, 456, 520, 521, 566, 156/567, 568, 571
See application file for complete search history.

(56) References Cited

U.S. PATENT DOCUMENTS 5,486,253 A * 1/1996 Otruba .......................... 156/215
5,904,804 A * 5/1999 Kouda et al. .................. 156/540
2002/0007919 A1* 1/2002 Cavaggioni et al. .......... 156/556

FOREIGN PATENT DOCUMENTS

DE 1486155 A1 4/1969
EP 2109089 A2 10/2009
(Continued)

OTHER PUBLICATIONS

"International Application Serial No. PCT/EP2011/069780, International Search Report mailed Feb. 8, 2012", 4 pgs.
(Continued)

*Primary Examiner* — Richard Crispino
*Assistant Examiner* — Matthew Hoover
(74) *Attorney, Agent, or Firm* — Schwegman Lundberg & Woessner, P.A.

(57) ABSTRACT

The invention relates to a method for applying a label to an article travelling along an article path, said label being received on a movable surface at an input location to be retained against said surface whilst being glued and advanced to an output location, at which the label is transferred to the article; the article being rotated with a tangential speed about an axis whilst travelling at a speed along the path including providing at least three portions of surface with independent and controllable vacuum means for retaining the label, including curtailing the application of vacuum means at the first portion of the surface upon the first portion reaching the output location and interrupting the application of vacuum means at the third portion of the surface, with the trailing edge of the label being retained at the second portion of the surface.

10 Claims, 6 Drawing Sheets

(51) Int. Cl.

| | |
|---|---|
| ***B32B 37/00*** | (2006.01) |
| ***B31F 5/00*** | (2006.01) |
| ***B65H 29/00*** | (2006.01) |
| ***G05G 15/00*** | (2006.01) |
| ***B65C 3/16*** | (2006.01) |
| ***B29C 51/16*** | (2006.01) |
| ***B32B 38/04*** | (2006.01) |
| ***B65C 3/12*** | (2006.01) |
| ***B65C 9/04*** | (2006.01) |
| ***B32B 38/10*** | (2006.01) |
| ***B65C 9/00*** | (2006.01) |
| ***B65C 3/08*** | (2006.01) |
| ***B65C 9/18*** | (2006.01) |

(56) References Cited

FOREIGN PATENT DOCUMENTS

| | | | |
|---|---|---|---|
| GB | 1090708 | A | 11/1967 |
| WO | WO-2009106128 | A1 | 9/2009 |

OTHER PUBLICATIONS

"International Application Serial No. PCT/EP2011/069780, Written Opinion mailed Feb. 8, 2012".

* cited by examiner

METHOD FOR APPLYING LABELS TO ARTICLES

RELATED APPLICATIONS

This application is a U.S. National Stage Filing under 35 U.S.C. 371 from International Application No. PCT/EP2011/069780, filed on Nov. 9, 2011, and published as WO 2012/062823 A1 on May 18, 2012, which claims priority to Italian Patent Application Serial No. TO2010A000894, filed on Nov. 9, 2010; which applications and publication are incorporated herein by reference in their entirety.

TECHNICAL FIELD

The present invention relates to a method for applying labels to articles—such as bottles, pots, cans, and the like—travelling along an article path, e.g. in a labelling machine.

More particularly, the present invention refers to a method for the application of labels of the type cut off a roll of labelling material at appropriate lengths, then glued and transferred onto the surface of containers.

BACKGROUND ART

Labelling machines for automatically performing these operations are well known in the art and their use is widespread in the packaging industry.

In these machines, containers are typically carried by a carrousel along an article path so as to advance towards a labelling station. At the same time, a web of labelling material is fed from a roll-feeding group to a "vacuum drum", whereby said web is brought into contact with cutting means to be cut into labels of appropriate length. Subsequently, glue is applied on the labels as they are borne by the vacuum drum, e.g. by means of a gluing drum, spray and injector systems or the like. Glued labels are finally transferred from the vacuum drum to the containers.

For proper performance of these operations, accurate handling of the labels is pursued through retention thereof on the surface of the vacuum drum, i.e. by applying vacuum on the labels in a controlled manner. To this purpose, the surface of the vacuum drum comprises a plurality of orifices that can be fluidically connected with a vacuum source.

In particular, this type of labelling process is commonly applied with flexible containers, such as bottles of PET, the use of which is customary in the food and drink industry.

An effort is currently being made, especially in the beverage industry, to lightweight PET containers, with a view to reducing household packaging waste originating, in particular, from the retail sector.

In fact, lightweighting beverage packaging provides a powerful way to minimise waste at source, and to reduce raw material processing and distribution costs. In particular, the energy consumed in the drying of resin and in the melting of PET to make a pre-form and then a bottle is directly related to its weight. Therefore, the potential reduction in energy consumption is proportional to the weight that may avoid being processed.

The weight of PET bottles is determined predominantly by the bottle performance requirements and specification of the neck and base.

In particular, the neck design is influenced by handling requirements, e.g. during filling operations, and by the style of closure used. Different neck finishes have different weights associated with their design features.

The design and weight of the base is mainly related to the requirement to withstand the internal pressure, hence still water bottles can have thinner, and therefore lighter, bases than bottles intended for filling with carbonated beverages.

In general, the mid-section body of a PET bottle has consequently been the obvious focus for manipulation of design for lightweighting, since there are less strict requirements to be accounted for in this respect. In practice, lightweighting has been achieved by pursuing better material distribution during the blow moulding steps, by exploiting novel PET resin compositions and improvements in pre-form heating in blow moulding machines.

However, lightweight PET bottles have a drawback in that they exhibit a peculiar creep behaviour, i.e. they expand quite dramatically with time after filling (especially with carbonated products). Plastics are visco-elastic materials, hence they continue to respond to applied pressures over time, even well after completion of the filling and labelling operations.

Unfortunately, labels, or any other wrapped-type packaging, applied onto the surface of the mid-section body of a lightweight bottle in accordance with the labelling methods known in the art, are highly likely to be severely damaged upon the progressive expansion described above.

The need is therefore felt, in the art, for a method for handling and applying labels to articles travelling along an article path, whereby the drawback described above can be overcome in straightforward and inexpensive fashion.

More particularly, the need is felt for a method for handling and applying labels to articles, whereby lightweight PET bottles can be effectively labelled substantially without the creep-related expansion thereof interfering with the accuracy of application and positioning of the label onto the surface of the mid-section body of the bottles.

DISCLOSURE OF INVENTION

It is therefore an object of the present invention to provide a method for applying labels to articles which satisfies at least one of the above needs.

This object is achieved by a method for applying labels to articles as claimed in claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
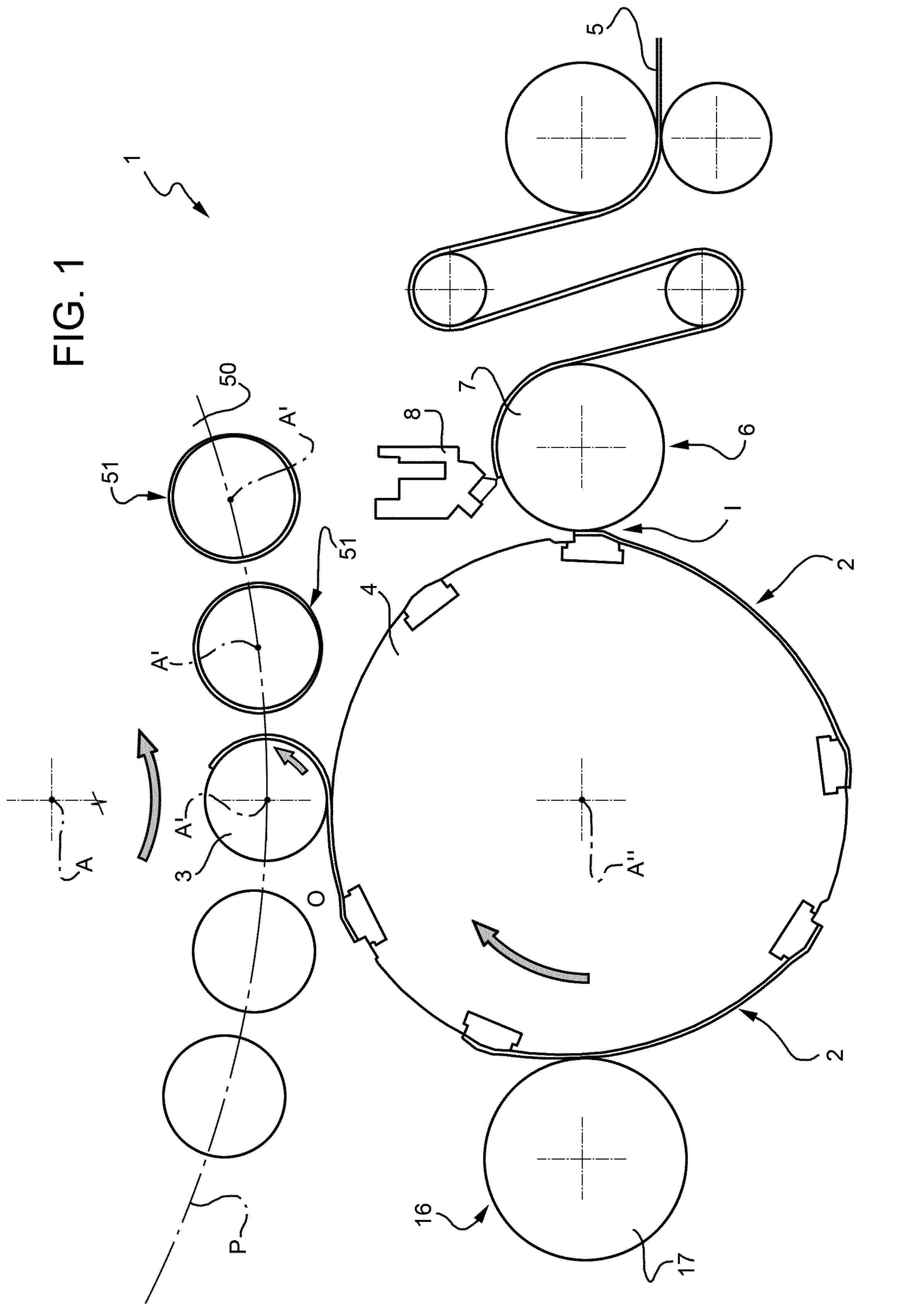
FIG. 1 shows a schematic view of a labelling station at which a succession of labels is being handled and applied onto the surface of containers advancing along an article path.

Number 1 in FIG. 1 indicates as a whole a labeling station of a labeling machine. The labeling station 1 is adapted to be used for handling, transferring and applying labels 2 to respective articles 3 or, more specifically, containers, such as bottles (known per se and not illustrated), as said articles 3 are advanced along an article path P. In particular, the labeling station 1 comprises a vacuum drum 4 for handling and transferring the labels 2.

At least for a portion of article path P, the articles 3 are carried by a carousel 50 comprising a number of support plates 51 which are equally spaced about a rotation axis A, are mounted along a peripheral edge of the carousel and are moved by the latter along a substantially circular path.

Each support plate 51 is, in turn, rotatable about a respective axis A', parallel to the axis A of the carousel, so that articles 3 may be rotated as they are advanced along the substantially circular portion of article path P.

As illustrated schematically in FIG. 1, a web 5 of labeling material is fed off a roll-feeding group (not shown) and to a cutting unit 6, which comprises a cutter drum 7 and cutting means 8 of a known type. Labels 2 are obtained as lengths of labeling material of substantially rectangular shape which are cut off the web 5 after the leading edge thereof is transferred from the cutter drum 7 to the vacuum drum 4 and engages the cutting means 8.

The vacuum drum 4 therefore receives a succession of labels 2 at an input location I, which is proximal to the cutting unit 6, and transfers said succession of labels 2 to the articles 3 at an output location O arranged at a given angular distance from the input station I about an axis of rotation A" of the vacuum drum 4.

Figure 2:
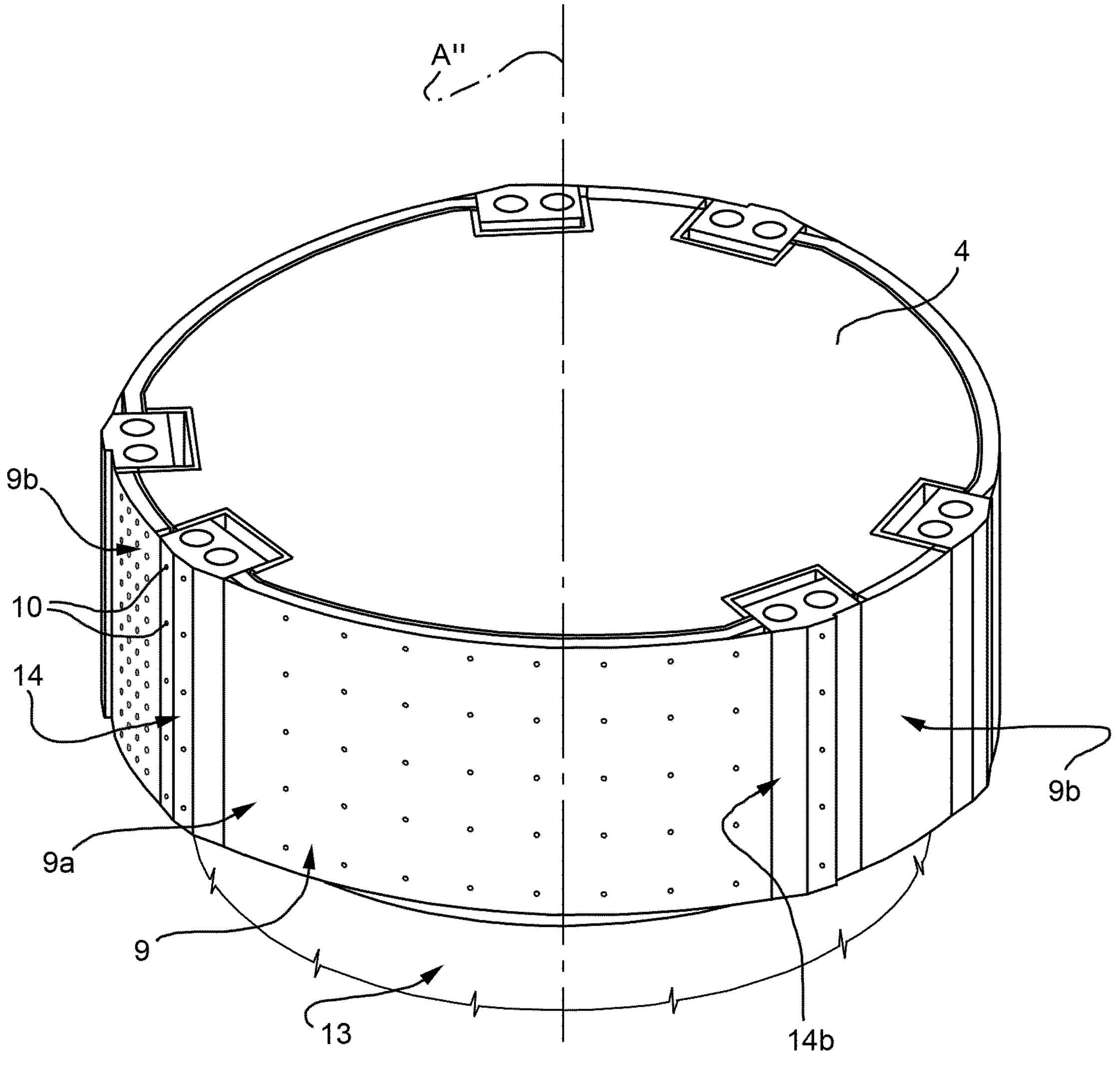
FIG. 2 shows a schematic view in perspective of the vacuum drum of FIG. 1.
Figure 3:
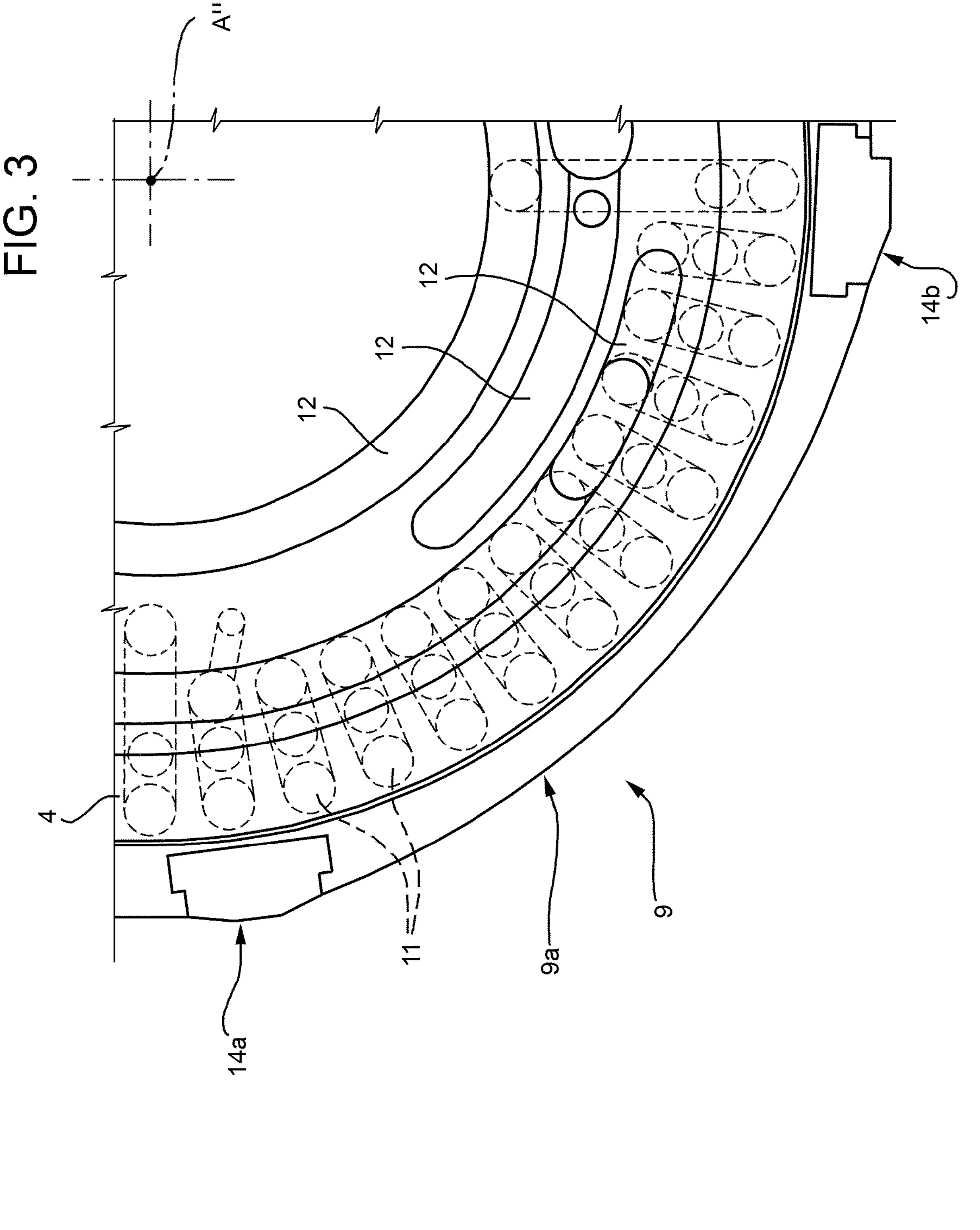
FIG. 3 shows a schematic detail view on a larger scale of a portion of the vacuum drum of FIGS. 1 and 2.

As illustrated with further reference to FIG. 2, the vacuum drum 4 comprises peripherally a lateral surface 9 adapted to engage with the labels 2. The lateral surface 9 comprises at least one first section 9*a* having a plurality of through holes 10 in communication with internal passages (shown in FIG. 3). These passages 11 can be connected to a vacuum source (not shown) by means of suitable orifices or manifolds 12 present on a non-rotating base 13 on which the vacuum drum 4 is supported and rotated. In other words, when the rotating vacuum drum 4 reaches a position where the said passages 11 are in alignment with said orifices or manifolds 12, vacuum is applied on the surface of the said first section 9*a*.

In the embodiment illustrated in FIG. 2, three first sections 9*a* are present on the vacuum drum 4. Nevertheless, a different number of first sections 9*a* can be provided, depending on the capacity of the machine and on the length of the labels, hence more or less than three first sections 9*a* can be provided.

As shown in FIG. 2, two pads 14*a*, 14*b* are disposed at the two extremities of the at least one first section 9*a* of the lateral surface 9. These pads 14*a*, 14*b* are slightly protruding from the lateral surface 9 and are designed to engage, in use, with the leading and the trailing ends of a label 2, respectively. To this purpose, the pads 14*a*, 14*b* also present a plurality of through holes in communication with the passages 11 for vacuum supply.

In practice, the pads 14*a* and 14*b* define the zones of the periphery of the drum 4 where label transfer occurs.

The lateral surface 9 of the vacuum drum 4 further comprises at least one second section 9*b*, usually called "inter-pad" zone, which extends between a relative pair of pads 14*b*, 14*a*. In the embodiment illustrated in FIG. 2, three second sections 9*b* are present on the vacuum drum 4, which are equally spaced angularly from one another about the axis A" and are provided with through holes 15, also connectable with the orifices 12 in the non-rotating base.

In other words, considering the direction of rotation of the vacuum drum 4 (which direction is indicated in FIG. 1 by a cross-hatched arrow), each section 9*a* extends from a relative pad 14*a* to a relative pad 14*b*, whilst the corresponding section 9*b* extends from the downstream pad 14*b* to the next pad 14*a*.

As commented above with reference to the first sections 9*a*, also the overall number of second sections 9*b* provided in the lateral surface 9 of the vacuum drum 4 can vary, accordingly, depending on the capacity of the labelling machine and, even more so, on the length of the labels 2 to be processed, the minimum number being one.

As visible in FIG. 2, each section 9*b* has a smaller angular extension around axis A" than the angular extension of the relative section 9*a* and, in use, can serve the purpose of starting to attract the relative label 2 at the input location I, so that such label 2 is then received on the section 9*a* directly upstream and on the relative pads 14*a*, 14*b*.

The vacuum drum 4 works conventionally by rotating in the direction indicated by the cross-hatched arrow, so that it first receives, substantially at the input location I, the web 5 of labelling material, which is cut to obtain a label 2 of the desired length as it engages the cutting means 8.

More particularly, the web 5 first advances with the cutter drum 7 and is secured to the surface thereof by vacuum supply. The vacuum supply is conveniently discontinued when the web 5 of labelling material reaches the input location I, at which the leading edge of the web 5 can be picked by the vacuum drum 4.

As it is transferred substantially at the input location I, the labelling material is subject to a tension created by the simultaneous supply of vacuum from both the vacuum drum 4 and the cutter drum 7. As the transfer progresses, the influence of the vacuum supplied at the cutter drum 7 decreases, as the portion of labelling material retained by the vacuum drum increases. As a consequence, the web 5 comes to engage the cutting means 8.

At the cutting point, the cut label 2 is carried solely by the vacuum drum 4. The completion of the transfer can be considered to occur instantly at the cutting point, since the label mass is negligible with respect to the entity of the tractive forces acting thereupon.

As it is carried on the lateral surface 9 of the vacuum drum 4, the label passes by the gluing group 16, which comprises, in particular, a gluing drum 17, whereby a predetermined glue pattern is applied onto the side of the label 2 which will contact the surface of the container 3.

By virtue of the structure of the vacuum drum 4 described above, the through holes in the pads 14*a*, 14*b* and in the at least one section 9*a* of the lateral surface 9 of the vacuum drum can independently and controllably be fluidically connected with the vacuum source. Thus, each label 3 can be handled with accuracy over the whole course of operations.

For ensuring a good performance, precise positioning of the label 2 over the lateral surface 9 of the vacuum drum 4 can advantageously be pursued by retaining each label 2 received from the cutting unit 6 with the leading edge 20 held at a pad 14*a*, and the trailing edge 21 held at the pad 14*b* of the same pair of pads. This is achieved through accurate timing of the different drums by which the labels 2 are retained and by controlling the supply of vacuum throughout operation.

In particular, suction can be applied to each label 2 independently and controllably through each of three distinct retaining areas which are defined by the pads 14*a*, 14*b* and the section 9*a* comprised therebetween, respectively.

In practice, the non-rotatable base on which the vacuum drum 4 is mounted works as a stationary distributor member. The orifices or manifolds 12 of the base are connected to one or more independent vacuum sources, e.g. so that a different degree of vacuum can be associated to different orifices 12. As the vacuum drum 4 rotates about its axis A", the internal passages 11 communicate with certain orifices or manifolds 12 at certain predetermined angular positions corresponding to the performance of certain operations on the web 5 of labeling material/the labels 2. The degree of vacuum supplied at the pads 14*a*, 14*b* and at each section 9*a* comprised therebetween can accordingly be finely tuned with the operations of the labeling process.

As a consequence, the desired contact between label 2 and vacuum drum surface 9 may be ensured at all times, e.g. for allowing proper application of a complete glue pattern on the portions of label, as it is held at least at the pads 14*a*, 14*b*. Preferably, over the course of glue application, the label 2 is also retained at the relative section 9*a*.

Following glue application, the labelling operation is then completed by transferring the label 2 from the vacuum drum 4 to a respective article 3 being carried by carousel 50 and rotating, in turn, about the axis A' of a respective support plate 51.

In a so-called positive-spin arrangement, carousel 50 and vacuum drum 4 rotate in opposite directions, thus—at the label transfer—their respective outer surfaces move substantially in the same direction. This is the case illustrated in FIG. 1, where the vacuum drum 4 rotates in a clockwise direction, whereas the carousel 50 rotates in an anti-clockwise direction.

Alternatively, in a so-called negative-spin arrangement, carousel 50 and vacuum drum 4 rotate in the same direction, thus—at the label transfer—their respective outer surfaces move in opposite direction.

In both arrangements, however, the support plates 51 and the vacuum drum 4 shall rotate in opposite directions.

At the output location O, the motion of the label 2 being transferred from the vacuum drum 4 to the article 3 shall be affected by the velocity resulting from the combination of the simultaneous rotations of vacuum drum 4, carousel 50 and support plate 51.

In particular, the label 2 shall arrive at the output location O with a label process speed $V_1$ which corresponds to the tangential speed of vacuum drum 4.

At label transfer, the outer surface of the article 3 (onto which the label 2 has to be transferred) moves with a velocity which results from the composition of:

- a primary tangential speed $V_2$ given by rotation of the support plate 51, upon which the article 3 is placed, about its own axis A'; with
- a secondary tangential speed $V_3$ given by rotation of the same support plate 51 about the axis A' of carousel 50.

Figure 4:
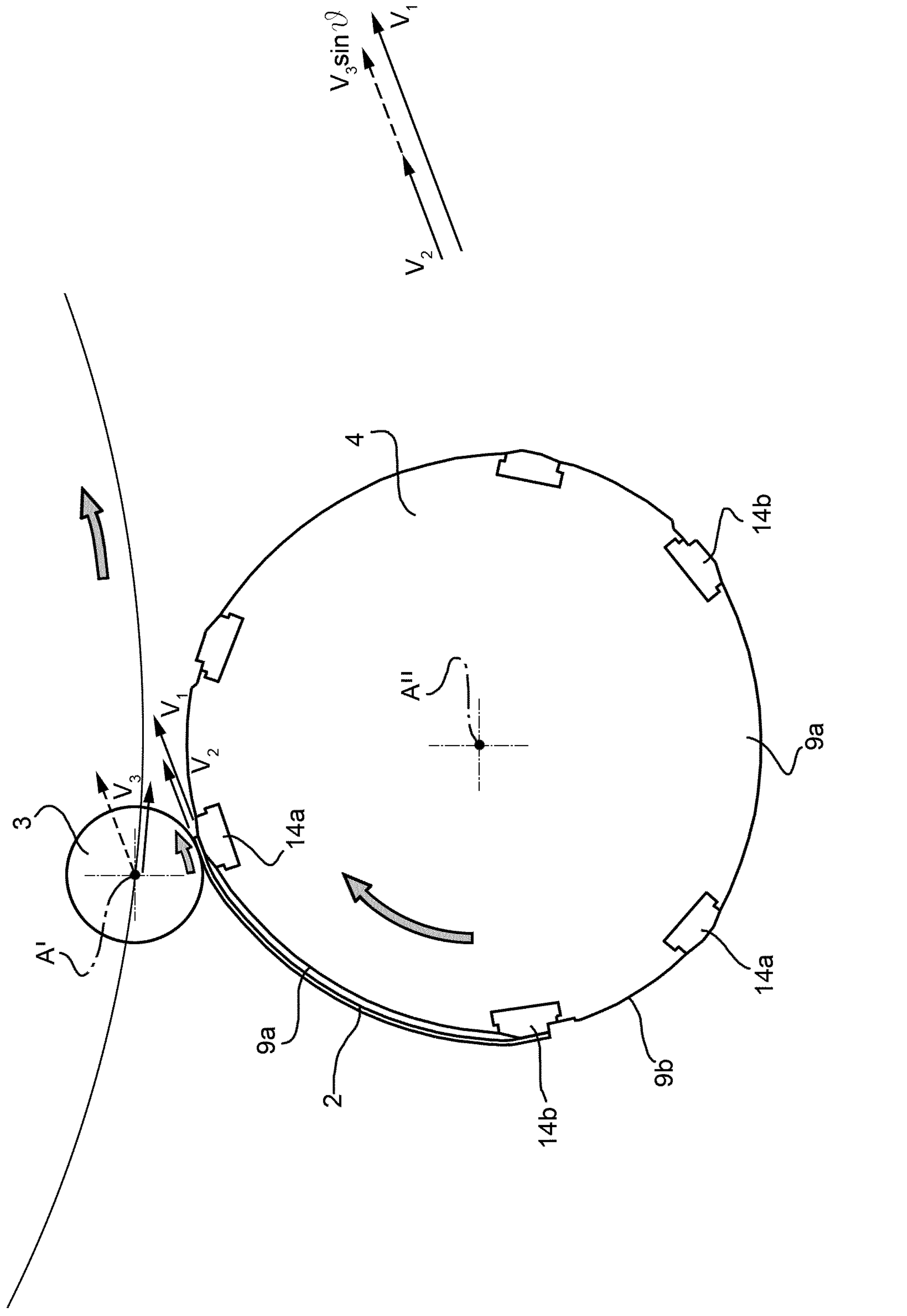
FIGS. 4 to 6 show a schematic view of the labelling station of FIG. 1 in three subsequent operative positions in accordance with the method of the invention.

Reference can be made to FIG. 4, where cross-hatched arrows indicate the direction of rotation of the parts involved, whereas straight arrows qualitatively indicate the above-identified tangential speeds $V_1$, $V_2$ and $V_3$.

Advantageously, for transfer of a label 2 from the vacuum drum 4 onto a relative article 3:

- the supply of vacuum at the pad 14*a* by which the leading edge of the label 2 is being retained is curtailed, approximately upon said pad 14*a* reaching the output location O, i.e. when the leading edge of label 2 can effectively engage with the outer surface of the article 3; and
- the supply of vacuum at the section 9*a* is shut off, preferably immediately after curtailing the supply of vacuum at the pad 14*a*.

Furthermore, the speeds of rotation about the respective axes of vacuum drum 4, carousel 50 and support plate 51 are advantageously set such that, at the output location O the label process speed $V_1$ is greater than the speed resulting from the combination of primary tangential speed $V_2$ and secondary tangential speed $V_3$.

The suppression of the supply of vacuum at section 9*a* during label transfer results into the absence of contact between the label 2 being transferred and the surface of the vacuum drum, if not for the trailing edge of the label which is still being retained at pad 14*b*.

Figure 5:
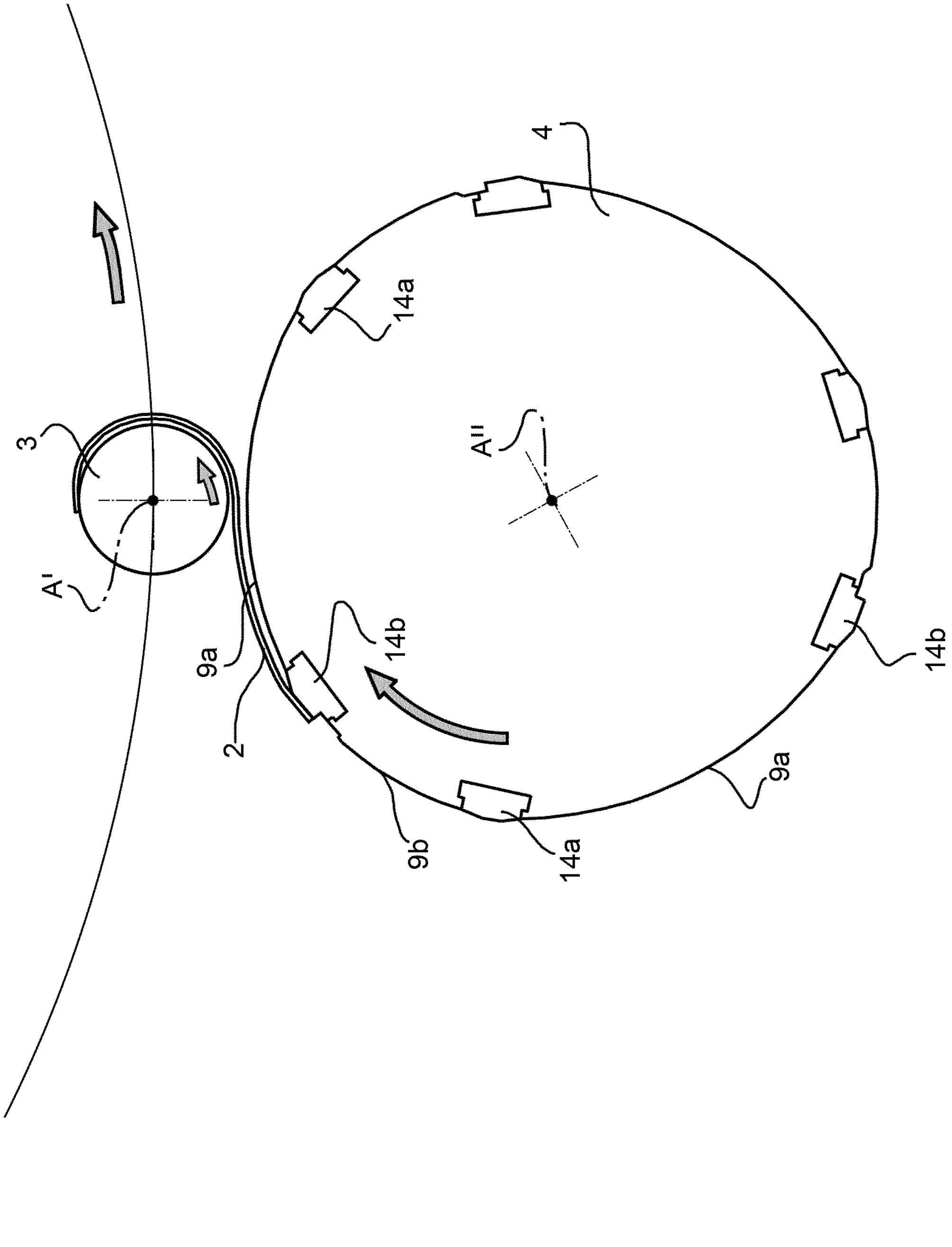

As a consequence, as illustrated in FIG. 5, the label 2 is wound loosely over the outer surface of the article 3 rotating substantially integral with the support plate 51.

Figure 6:
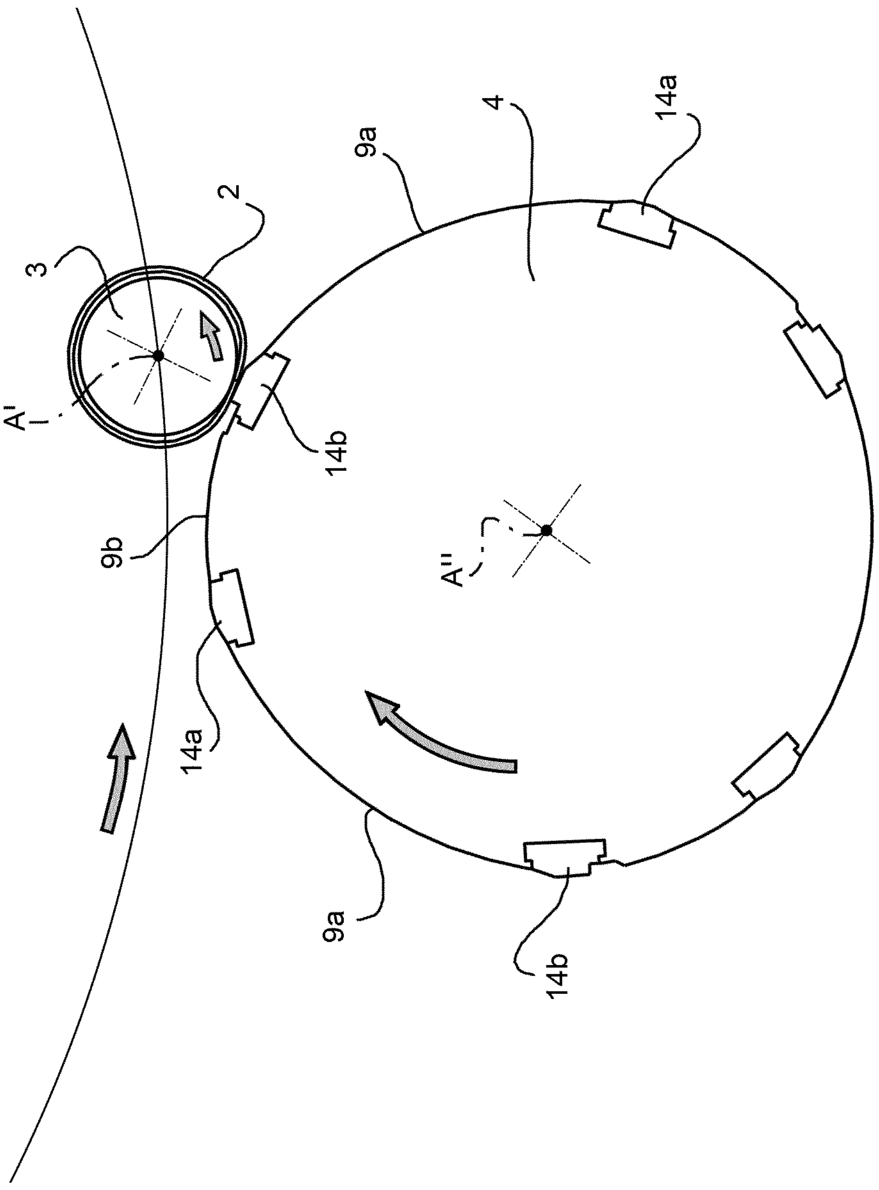

To complete label transfer (see FIG. 6), the supply of vacuum at the pad 14*b* is curtailed when the trailing edge of the label 2 reaches the output location O.

In particular, because at label transfer the label 2 is gripped strongly but solely at its leading and trailing edges, i.e. because vacuum is supplied at label transfer at the pads 14*a*, 14*b* but not at section 91, and because the support plate 51 is rotated at a controlled speed in relation to the speed of the other moving parts of the labelling station 1, it is possible, according to the method of the invention, to apply a label 2 on an article 3 with a precisely controlled slackness.

Advantageously, said slackness can therefore be tailored and matched to the expected ultimate level of expansion of the article 3, particularly in the case where the article 3 is a flexible container, e.g. a bottle, which undergoes a significant creep-related expansion upon filling. The expected ultimate level of expansion can be estimated as a function of the material properties and of the pressurisation and storage conditions.

Besides, the method of the invention allows light labelling material to be applied to lightweight containers with minimum glue application levels and good results.

The method can advantageously be applied to both positive-spin and negative-spin arrangements of carousel 50 and vacuum drum 4 in a labelling machine.

In particular, in a negative-spin arrangement, since the relevant component of the secondary tangential speed $V_3$ shall have opposite direction with respect to the primary combination shall nearly inevitably be lower than the label process speed $V_1$. In other words, the kinematic relationship described above shall not require a particularly fine tuning of speed control to be maintained.

On the other hand, in a positive-spin arrangement, a more thorough care shall be required to ensure that the label process speed $V_1$ be greater than the speed resulting from the combination of primary tangential speed $V_2$ and relevant component of secondary tangential speed $V_3$, since these will have the same direction.

The invention claimed is:

1. A method for applying a label to an article travelling along an article path in a labelling machine, wherein said label is received on a movable surface at an input location to be retained against said surface whilst being glued and advanced, through motion of said surface, to an output location, at which said label is transferred to said article; and wherein the article is rotated with a tangential speed about an axis whilst travelling at a speed along said path; the method comprising:

- providing at least three portions of said surface with independent and controllable vacuum means for retaining said label onto said surface;
- retaining, through application of said vacuum means, a leading edge of said label at a first one of said three portions and a trailing edge of said label at a second one of said three portions, at least whilst the label is advanced at a label process speed between said input location and said output location; a mid-section of said label facing a third one of said three portions;
- transferring said label onto said article;

wherein said step of transferring said label onto said article comprises:

curtailing the application of said vacuum means at said first one portion of said surface upon said first portion reaching said output location; and interrupting the application of said vacuum means at said third portion of said surface; the trailing edge of said label being retained at said second portion of said surface;

with said process speed being greater than the speed resulting from the combination of said tangential speed and of said travelling speed.

2. The method according to claim 1, wherein said label is cut off a web of labelling material upon engagement with cutting means arranged upstream from said input location.

3. The method according to claim 1, wherein said article is carried along said article path by a carousel rotating about an axis substantially parallel to said axis of rotation of said article; and wherein said surface is carried by a vacuum drum rotating about an axis substantially parallel to said axis of rotation of said article, the direction of rotation of said vacuum drum being opposite to the direction of rotation of said article.

4. The method according to claim 3, wherein the direction of rotation of said carousel is the same as the direction of rotation of said vacuum drum.

5. The method according to claim 3, wherein the direction of rotation of said carousel is opposite to the direction of rotation of said vacuum drum.

6. A method for applying a label to an article travelling along an article path in a labelling machine, wherein said label is received on a movable surface at an input location to be retained against said surface whilst being glued and advanced, through motion of said surface, to an output location, at which said label is transferred to said article; and wherein the article is rotated with a tangential speed about an axis whilst travelling at a speed along said path; the method comprising:

providing at least three portions of said surface with an independent and controllable vacuum for retaining said label onto said surface;

retaining, through application of said vacuum, a leading edge of said label at a first one of said three portions and a trailing edge of said label at a second one of said three portions, at least whilst the label is advanced at a label process speed between said input location and said output location; a mid-section of said label facing a third one of said three portions;

transferring said label onto said article;

wherein said step of transferring said label onto said article comprises:

curtailing the application of said vacuum at said first one portion of said surface upon said first portion reaching said output location; and interrupting the application of said vacuum at said third portion of said surface; the trailing edge of said label being retained at said second portion of said surface, with said process speed being greater than the speed resulting from the combination of said tangential speed and of said travelling speed.

7. The method according to claim 6, wherein said label is cut off a web of labelling material upon engagement with a cutter arranged upstream from said input location.

8. The method according to claim 6, wherein said article is carried along said article path by a carousel rotating about an axis substantially parallel to said axis of rotation of said article; and wherein said surface is carried by a vacuum drum rotating about an axis substantially parallel to said axis of rotation of said article, the direction of rotation of said vacuum drum being opposite to the direction of rotation of said article.

9. The method according to claim 8, wherein the direction of rotation of said carousel is the same as the direction of rotation of said vacuum drum.

10. The method according to claim 8, wherein the direction of rotation of said carousel is opposite to the direction of rotation of said vacuum drum.

* * * * *